Patented Feb. 22, 1949

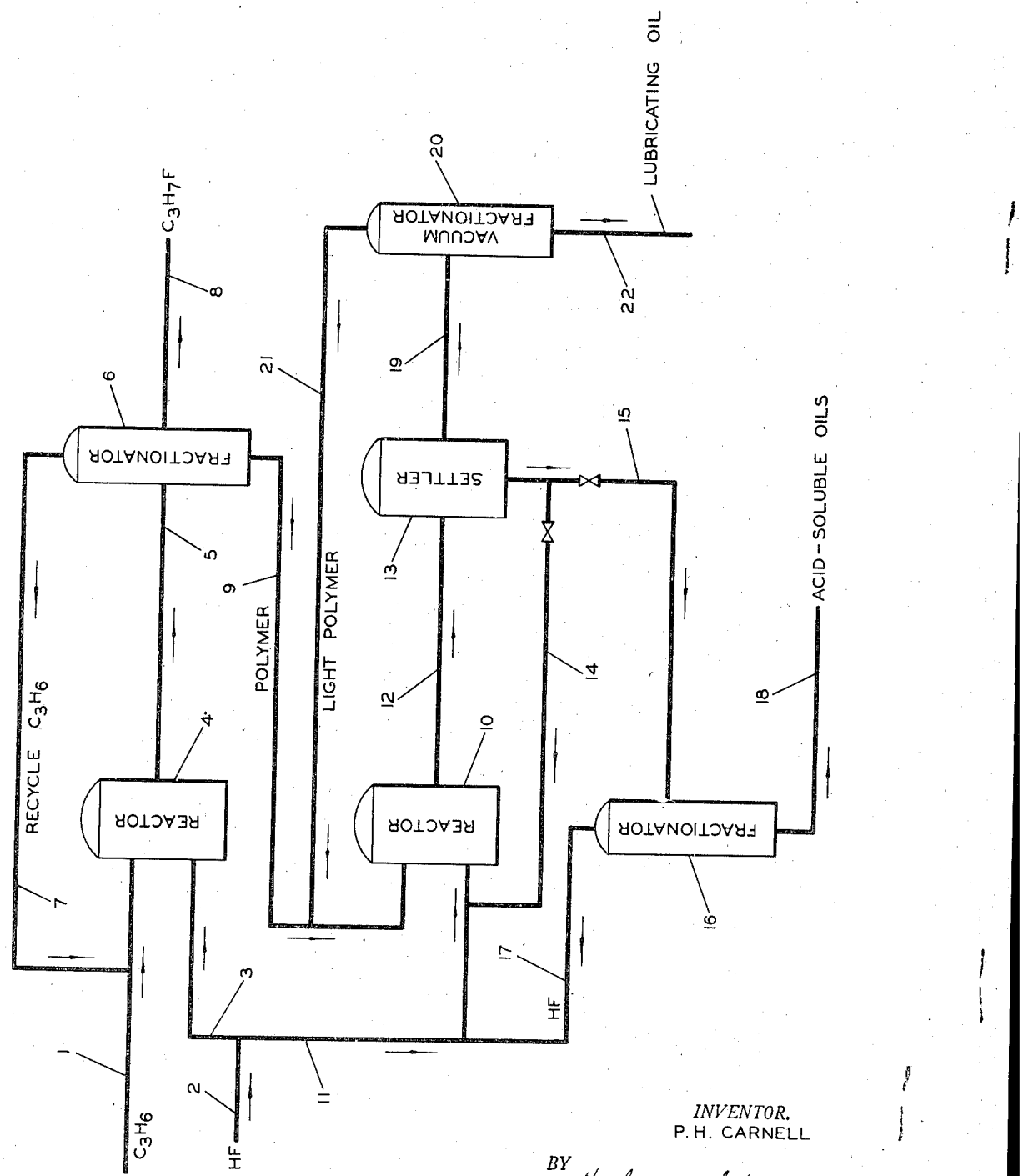

2,462,360

UNITED STATES PATENT OFFICE 2,462,360

METHOD OF PREPARING LUBRICATING OILS

Paul H. Carnell, Bartlesville, Okla., assignor to Phillips Petroleum Company, a corporation of Delaware Application May 20, 1946, Serial No. 671,110

10 Claims. (Cl. 196—13)

This invention relates to a process of preparing lubricating oils. The product of the present invention is a liquid which may be used as a lubricating oil or as a constituent of lubricating oil. In one aspect, the invention relates to a process of treating an olefin polymer, formed as a by-product in certain processes wherein low-boiling aliphatic olefins are contacted with hydrofluoric acid, in such a manner as to improve those properties which are required of lubricating oil or lubricating oil components.

In reactions involving the contacting of aqueous or anhydrous hydrofluoric acid with low-boiling aliphatic olefins, particularly the formation of alkyl fluorides by hydrofluorination of the olefins or the preparation of aliphatic monohydric alcohols by the hydration of the olefins with aqueous hydrofluoric acid, a minor proportion of the olefin is converted to polymers which are ordinarily discarded as undesirable by-products of the main processes mentioned.

For example, when low-boiling aliphatic olefins, especially those having at least three carbon atoms per molecule such as propylene, isobutylene, butene-1 or butene-2 are hydrofluorinated to form the corresponding alkyl fluorides by treatment with anhydrous hydrofluoric acid, for example in accordance with the teachings of Grosse and Linn "The Addition of Hydrogen Fluoride to the Double Bond," Journal of Organic Chemistry, vol. III, pages 26-32 (1938), or Grosse and Thomas U. S. Patent 2,220,713, or in the manner taught in M. P. Matuszak U. S. Patent 2,387,162 or in M. P. Matuszak, U. S. Patent 2,456,435, some of the olefin, usually not more than about 35 per cent, is polymerized. Usually the reaction is conducted with as mild conditions as possible in order to minimize olefin polymerization, but some polymerization seems to be inevitable, at least where the olefin is propylene or higher. It is often preferred to use substantially equimolecular proportions of olefin and HF in order to keep polymerization of olefin at a minimum. For example, a molar ratio of HF to olefin of from 1:1 to 1.1:1 may be employed. At ratios less than 1 there is insufficient HF to combine with all the olefin, whereas at ratios above 1.1 polymerization may become considerable or even excessive.

An olefin polymer having the same or very nearly the same properties as that formed in the hydrofluorination of olefins in the manner described above is formed when low-boiling aliphatic olefins, especially those having three or more carbon atoms per molecule such as propylene and butylenes, are hydrated to the corresponding aliphatic monohydric alcohols with aqueous hydrofluoric acid in the manner described and claimed in the copending application of F. E. Frey, Serial No. 521,833, filed February 10, 1944, a minor proportion of the olefin charged is converted to polymer. The amount of polymer formed under optimum hydration conditions is usually not over 10 to 20 per cent of the olefin charged. It is likewise customary to discard this polymer.

It appears that the polymers of the type referred to above and with which the present invention is concerned are formed when low-boiling aliphatic olefins are contacted with anhydrous or aqueous hydrofluoric acid, the proportions of olefin and HF being such that each is present in substantial proportion. For example, the molar ratio of HF to olefin in the reaction zone wherein the polymer is formed may range from 10:1 to 0.5:1. Generally it will be at least 1:1 and often it may be substantially 1:1, say ranging from 1.1:1 to 1:1. It further appears that such polymers are formed under relatively mild conditions, especially of temperature and pressure.

The object of this invention is to treat such by-product olefin polymers to obtain lubricating oils. Another object is to substantially improve the lubricating properties of such polymers. Another object is to provide a simple and economical process of improving those properties of such polymers which are required of lubricating oils. Numerous other objects will more fully hereinafter appear.

I have found that the by-product olefin polymers of the type described in detail above have rather poor lubricating properties. I have found, however, that when such polymers are treated with substantially anhydrous hydrofluoric acid at elevated temperature and pressure, products are obtained that are quite satisfactory as lubricating oils or components thereof. Both the original and the treated polymer are oily liquids.

The olefin polymer treated in accordance with the present invention may be any aliphatic low-boiling olefin polymer produced as a by-product in the contacting of low-boiling aliphatic olefins with hydrofluoric acid. The most important source of such polymers is the hydrofluorination of olefins with anhydrous hydrofluoric acid in the manner described in detail above. A less common source of such polymers is the hydration of olefins with aqueous hydrofluoric acid as also described in detail above. As stated above, the molar ratio of HF to olefin in the reaction zone where the polymer is formed may range from 10:1 to 0.5:1, is generally at least 1:1, and may often range from 1.1:1 to 1:1. Furthermore, such polymers are commonly formed under relatively mild reaction conditions, especially of temperature and pressure. Any low-boiling aliphatic olefin ranging from ethylene to amylenes may be used, including ethylene, propylene, either of the normal butylenes, isobutylene, and any of the amylenes. I often prefer to use polymer formed from propylene or higher olefin.

It is emphasized that the by-product polymers used as starting materials in the process of this invention are physically and chemically different from the products of processes in which olefins are deliberately polymerized to obtain polymers as primary products. In general, the by-product polymers have lower average molecular weights and boiling ranges.

Thus, a typical polymer used as starting material for the present invention would, when topped to 400° F. under nearly a full vacuum, say not over 10 mm. of mercury absolute pressure, have a viscosity of from 100 to 150 SUS at 100° F. and of from 20 to 50 SUS at 210° F., and a viscosity index (by the Dean & Davis method) of not over 20, say from 5 to 15. It may have a pour point as low as −30° F. The API gravity may range from 30 to 50, and the ASTM color may be as high as 5.

The general procedure in practicing the present invention will involve treating the olefin polymer with substantially anhydrous hydrofluoric acid at elevated temperature and pressure for a period of time sufficient to accomplish a substantial improvement in the properties as a lubricating oil or lubricating oil component, and recovering the treated olefin polymer from the resulting reaction mixture in any suitable way. Generally there will be two phases present, namely an acid phase and a hydrocarbon phase, so that vigorous agitation to maintain an intimate emulsion of the phases with one another is necessary for satisfactory results. For this purpose any suitable means may be employed, an example being the "Stratco contactor" which has been widely used in the hydrofluoric acid alkylation of isoparaffins. Suitable means is also provided for maintaining the temperature at the proper level in the reaction zone.

The reaction mixture may be cooled and fed into a suitable settling zone where it is allowed to settle by gravity into separate acid and hydrocarbon layers. These layers may be separately withdrawn. The acid layer may be recycled to the reaction zone. If desired a portion of the acid layer may be fed to a re-run unit where it may be fractionally distilled to remove acid-soluble oil, and any water attaining entrance to the system, as a kettle product; and anhydrous HF as a vaporous overhead product which is passed to the reactor. The hydrocarbon layer may be treated in any suitable manner to recover the treated olefin polymer therefrom. Thus it may be washed with cold dilute caustic solution to remove traces of HF, dried, and topped under vacuum to separate light material, primarily light polymer, from the treated lubricating oil range polymer. The light polymer is recycled. The vacuum topping may be carried out at a pressure of not over 10 mm. of Hg absolute and to any suitable temperature, conveniently to 400° F.

If desired the caustic washing of the hydrocarbon layer may be omitted in which case the bulk of any free HF therein may be recovered in admixture with the light ends by distillation and thereby returned to the reactor. The lubricating oil fraction recovered as kettle product may be caustic washed to remove traces of HF.

The reaction conditions for the hydrofluoric acid treatment of the polymer will vary with the particular polymer and with the results desired. I have found that in the case of the polymer formed in the preparation of isopropyl fluoride by reacting propylene with anhydrous hydrofluoric acid, the reaction between the polymer and substantially anhydrous hydrofluoric acid in accordance with the present invention is preferably conducted at temperatures of from 75 to 100° C. and pressures from 100 to 250 pounds per square inch gauge. High temperatures and pressures should be avoided for they tend to give a product with a somewhat lower viscosity index, a high pour point, and a high ASTM color. The relative proportions of the olefin polymer and HF employed in carrying out the present invention may vary within wide limits. Generally the weight ratio of HF to olefin polymer will vary from 0.5:1 to 10:1. I prefer to use a weight ratio of HF to olefin polymer in excess of 1:1. Very often a ratio of 2:1 or thereabouts is employed.

The temperature at which the treatment of the present invention is conducted may vary widely, but is preferably confined within the relatively narrow range of from 75 to 100° C.

The pressure likewise may vary widely but is preferably within the range of from 100 to 250 pounds per square inch gauge. The pressure is always sufficient to keep both the hydrofluoric acid and the hydrocarbon in liquid phase in the reaction zone.

The time of treatment of the polymer with the hydrofluoric acid in accordance with the present invention should be sufficient to produce a substantial improvement in those properties which are required of lubricating oils or lubricating oil constituents. Generally speaking, times within the range of from 20 to 140 minutes may be employed. A time ranging from 100 to 130 minutes is often preferred.

The properties of the polymer which are improved in accordance with the present invention are one or more of the following: viscosity index, pour point, API gravity and ASTM color. Most important properties affected are viscosity index and pour point.

Generally the reactants charged to the reaction zone consist of substantially anhydrous hydrofluoric acid and the olefin polymer, the lubricating properties of which are to be improved. However, I do not wish to preclude the use of an inert diluent such as aliphatic $C_3$ to $C_6$ paraffins. Use of such a diluent may in some cases be deemed desirable.

The process of the present invention may be conducted either in a batchwise manner or continuously, the latter being preferred for commercial installations.

The chemical changes which take place in accordance with the treatment of the present invention are not understood at the present time. While I do not wish to make any explanation of the mechanism of the reaction, I do disclose herein the procedure employed in sufficient detail to enable the ordinary worker in the art to duplicate the invention.

The accompanying drawing, which is a schematic flow diagram of a preferred embodiment of the invention, illustrates one mode of practicing the invention in conjunction with a process for preparing isopropyl fluoride. An olefin, such as propylene, is introduced into reactor 4 through line 1. In reactor 4 the propylene is treated with anhydrous hydrofluoric acid which is introduced through lines 2 and 3. The relative amounts of hydrofluoric acid and propylene introduced should be such that a stoichiometric excess of the propylene is maintained. This condition may be maintained by multipoint addition of propylene. After an adequate reaction period, usually 100 to 200 minutes, at a temperature of 10 to 40° C., the reaction effluent is passed through line 5 to fractionator 6. In fractionator 6 the reaction product is distilled into three fractions: (1) a fraction comprising unreacted propylene, which is recycled through line 7 to reactor 4; (2) a fraction comprising isopropyl fluoride, which is removed through line 8 as a product of the process; and (3) a residual fraction comprising olefin polymer.

The olefin polymer is passed through line 9 to reactor 10, where it is contacted with anhydrous hydrofluoric acid which enters the reactor through lines 2 and 11. In reactor 10 the olefin polymer and anhydrous hydrofluoric acid are agitated at elevated temperature and pressure for the desired contact time, usually 20 to 140 minutes, depending on the type of agitation. The effluent from reactor 10 is passed through line 12 to settler 13, where the acid and hydrocarbon layers are separated. Most of the acid layer from settler 13 is recycled through line 14 to reactor 10; the remainder is passed through line 15 to fractionator 16. In fractionator 16 the acid layer is fractionally distilled into two fractions: (1) an anhydrous hydrofluoric acid fraction which is recycled through line 17 to reactor 10; and (2) an acid-soluble oil fraction, which is withdrawn through line 18.

The hydrocarbon layer from settler 13 is passed through line 19 to vacuum fractionator 20. From vacuum fractionator 20, the fraction comprising light polymer is recycled through line 21 to reactor 10. Lubricating oil is withdrawn through line 22 as a product of the process. The lubricating oil may be caustic washed to remove traces of hydrofluoric acid.

The following are specific examples of the practice of the present invention.

A quantity of isopropyl fluoride was prepared by gradually adding anhydrous HF (8.6 lbs.) to propylene (18 lbs.) in an 18-liter steel reactor provided with a mechanical stirrer. The quantities of propylene and HF were substantially equimolar, a very slight molar excess of HF being used. The contact time was 140 minutes; the maximum temperature was 35° C. The polymer formed in this run was recovered as a kettle residue after fractionation of the hydrocarbon layer to remove propylene and isopropyl fluoride.

The procedure for the runs investigating the reaction of the propylene polymer with HF, at elevated temperature and pressure, was as follows:

A 4.5-liter steel bomb was charged with HF and a portion of the propylene polymer. The charged bomb was clamped to a platform rocker and was heated and agitated for a selected period of time. The bomb was removed from the rocker and placed in a vertical position. The bomb contents were allowed to cool and settle and were then withdrawn. The acid and hydrocarbon layers were separated and the hydrocarbon layer was washed with cold dilute caustic to remove traces of HF. This material was then dried and topped, at approximately 3 to 4 mm. of mercury, to 400° F.

A sample of the original polymer was topped, at approximately 3 to 4 mm. of mercury, to 400° F.

The following test data were obtained for the product oils:

*Example*

|  | 1 | 2 | Original polymer (topped to 400° F. at about 3-4 mm. Hg) |
| --- | --- | --- | --- |
| HF, gm | 363 | 1,816 | |
| Propylene polymer, gm | 509 | 915 | |
| Maximum temperature, °C | 172 | 85 | |
| Maximum pressure, p. s. i | 865 | 185 | |
| Contact time, min | 55 | 120 | |
| Properties of Lube Oil Fraction: | | | |
| Viscosity, 100° F., SUS | 84.6 | 136.7 | 132.6 |
| Viscosity, 210° F., SUS | 37.02 | 40.85 | 39.91 |
| Viscosity Index (Dean & Davis) | 41 | 48 | 12 |
| Pour Point, °F | +60 | below −40 | −35 |
| API Gravity | 36.4 | 40.2 | 38.0 |
| ASTM Color | 8+ | 1+ | 3½ |

In run 1, the weight ratio of hydrofluoric acid to olefin polymer is 0.71 to 1; and in run 2, the weight ratio of hydrofluoric acid to olefin polymer is 1.98 to 1.

It is evident from the data that viscosity index, pour point, and color were improved by the treatment at 85° C. The advantages of treating at 85° C., as compared with treating at 172° C., are also apparent.

From the foregoing it will be seen that the present invention provides a simple and economical method of improving the lubricating properties of by-product olefin polymers produced in processes involving treatment of low-boiling aliphatic olefins with hydrofluoric acid. The invention is particularly applicable to improving the properties of the by-product olefin polymer which is produced in the hydrofluorination of aliphatic olefins with anhydrous HF, particularly polymers produced from propylene or higher aliphatic olefins. However, the invention is not limited to the treatment of olefin polymers formed as by-product in such hydrofluorination, but is applicable generally to olefin polymers formed as by-product in processes involving contacting low-boiling aliphatic olefins with hydrofluoric acid wherever such polymers are deficient in the properties required of lubricating oils or lubricating oil constituents.

I claim:

1. The method of preparing lubricating oil from olefin polymer formed as by-product in the hydrofluorination of a low-boiling aliphatic olefin by contacting said olefin with anhydrous hydrofluoric acid, said polymer when topped to 400° F. under a pressure of not over 10 mm. of mercury absolute having a viscosity of from 100 to 150 SUS at 100° F. and of from 20 to 50 SUS at 210° F., and a viscosity index (Dean & Davis) of not over 20, which comprises treating said polymer with substantially anhydrous hydrofluoric acid in an amount such as to give a weight ratio of HF to said polymer in excess of 1:1 but not over 10:1 at a temperature of from 75 to 100° C. and a pressure of from 100 to 250 pounds per square inch gauge for a period of time ranging from 100 to 130 minutes such as to produce a substantial improvement in the viscosity index and pour point of said polymer, and recovering the treated olefin polymer from the resulting reaction mixture.

2. The method of preparing lubricating oil from propylene polymer formed as by-product in the hydrofluorination of propylene by contacting said propylene with anhydrous hydrofluoric acid, said polymer when topped to 400° F. under a pressure of not over 10 mm. of mercury absolute having a viscosity of from 100 to 150 SUS at 100° F. and of from 20 to 50 SUS at 210° F., a viscosity index (Dean & Davis) of not over 20, which comprises treating said polymer with substantially anhydrous hydrofluoric acid in an amount such as to give a weight ratio of HF to said polymer in excess of 1:1 but not over 10:1 at a temperature of from 75 to 100° C. and a pressure of from 100 to 250 pounds per square inch gauge and sufficient to maintain liquid phase for a period of time ranging from 20 to 140 minutes such as to produce a substantial improvement in the viscosity index and pour point of said polymer, and recovering the treated propylene polymer from the resulting reaction mixture.

3. The process of preparing lubricating oil from propylene polymer formed as a by-product in the hydrofluorination of propylene by contacting said propylene with anhydrous hydrofluoric acid, said polymer when topped to 400° F. at approximately 3 to 4 mm. of mercury absolute having approximately the following properties: viscosity at 100° F., 132.6 SUS; viscosity at 210° F., 39.9 SUS; viscosity index (Dean & Davis), 12; pour point, −35° F.; API gravity, 38.0; ASTM color, 3.5, which comprises intimately agitating said polymer with substantially anhydrous hydrofluoric acid in an amount such as to give a weight ratio of HF to said polymer of approximately 1.98:1 at a temperature of approximately 85° C. and a pressure of approximately 185 pounds per square inch gauge for a period of time of approximately 120 minutes, cooling the resulting reaction mixture and allowing same to settle into separate acid and hydrocarbon layers, separating the hydrocarbon layer and recovering the treated propylene polymer therefrom, said treated propylene polymer when topped to 400° F. at approximately 3 to 4 mm. of mercury absolute having approximately the following properties: viscosity at 100° F., 136.7 SUS; viscosity at 210° F., 40.8 SUS; viscosity index (Dean & Davis), 48; pour point, below −40° F.; API gravity, 40.2; ASTM color, 1+.

4. A method of preparing lubricating oil from an olefin polymer formed as a by-product in the treatment of a low-boiling aliphatic olefin with hydrofluoric acid, said polymer when topped to 400° F. under a pressure of not over 10 mm. of mercury absolute having a viscosity of from 100 to 150 SUS at 100° F. and of from 20 to 50 SUS at 210° F., a viscosity index (Dean & Davis) of not over 20, which comprises treating said polymer with substantially anhydrous hydrofluoric acid in an amount such as to give a weight ratio of hydrofluoric acid to said polymer in excess of 1:1 but not over 10:1, at a temperature of from 75 to 100° C., and a pressure of from 100 to 250 pounds per square inch gauge for a period of time ranging from 20 to 140 minutes such as to produce a substantial improvement in the viscosity index and pour point of said polymer, and recovering the treated olefin polymer from the resulting reaction mixture.

5. A method of preparing lubricating oil from olefin polymer formed as a by-product in the treating of a low boiling aliphatic olefin with hydrofluoric acid, which comprises treating said polymer as the sole reactive material with hydrofluoric acid in an amount sufficient to give a weight ratio of hydrofluoric acid to said polymer in excess of 1:1 but not more than 10:1, at a temperature of from 75 to 100° C., and a pressure of from 100 to 250 pounds per square inch gauge, for a period of time ranging from 100 to 130 minutes such as to produce a substantial improvement in the viscosity index and pour point of said polymer, and recovering the treated olefin polymer as a product of the process.

6. A method of preparing lubricating oil from olefin polymer formed as a by-product in the hydration of a low boiling aliphatic olefin to the corresponding alcohol with aqueous hydrofluoric acid, which comprises treating said polymer as the sole reactive material with hydrofluoric acid in an amount sufficient to give a weight ratio of hydrofluoric acid to said polymer in excess of 1:1 but not more than 10:1, at a temperature of from 75 to 100° C., and a pressure sufficient to maintain liquid phase, for a period of time ranging from 100 to 130 minutes such as to produce a substantial improvement in the viscosity index and pour point of said polymer, and recovering the treated olefin polymer as a product of the process.

7. A method of preparing lubricating oil from olefin polymer formed as a by-product in the hydration of a low-boiling aliphatic $C_2$ to $C_5$ olefin to a corresponding alcohol with aqueous hydrofluoric acid, which comprises treating said polymer as the sole reactive material present with substantially anhydrous hydrofluoric acid in an amount such as to give a weight ratio of hydrofluoric acid to said polymer of approximately 1.98:1 at a temperature of approximately 85° C. and at a pressure of approximately 185 pounds per square inch gauge for a period of time of approximately 120 minutes, cooling the resulting reaction mixture and allowing same to settle into separate acid and hydrocarbon layers, separating the hydrocarbon layer and recovering the treated polymer therefrom, said treated polymer when topped to 400° F. at approximately 3 to 4 mm. of mercury absolute having approximately the following properties: viscosity at 100° F., 136.7 SUS; viscosity at 210° F., 40.8 SUS; viscosity index (Dean and Davis), 48; pour point, below −40° F.; API gravity, 40.2; ASTM color, 1+.

8. A process according to claim 7 in which said olefin polymer is formed as a by-product in the hydration of propylene, said propylene polymer being the sole reactive material present.

9. A method of preparing lubricating oil from olefin polymer formed as a product in the hydrofluorination of a low-boiling aliphatic olefin by contacting said olefins with anhydrofluoric acid, which comprises treating said polymer as the sole reactive material present with substantially anhydrous hydrofluoric acid in an amount sufficient to give a weight ratio of hydrofluoric acid to said polymer in excess of 1:1 but not more than 10:1, at a temperature of from 75 to 100° C. and a pressure of from 100 to 250 pounds per square inch gauge, for a period of time ranging from 100 to 130 minutes, such as to produce a substantial improvement in the viscosity index and pour point of said polymer, and recovering the treated olefin polymer from the resulting reaction mixture.

10. A method of preparing lubricating oil from olefin polymer formed as a by-product in the hydrofluorination of a low-boiling aliphatic $C_2$ to $C_5$ olefin by contacting said olefin with anhydrous hydrofluoric acid, which comprises treating such an olefin polymer material, as the sole reactive material present and which comprises that fraction resulting when such a polymer is topped to 400° F. under a pressure of not more than 10 mm. of mercury absolute, having a viscosity of from 100 to 150 SUS at 100° F. and from 20 to 50 SUS at 210° F., and a viscosity index (Dean and Davis) of not over 20; with substantially anhydrous hydrofluoric acid in an amount such as to give a ratio of hydrofluoric acid to polymer in excess of 1:1 but not more than 10:1, at a temperature of from 75 to 100° C., and a pressure of from 100 to 250 pounds per square inch gauge and sufficient to maintain liquid phase, for a period of time ranging from 100 to 130 minutes, such as to produce a substantial improvement in the viscosity index and pour point of said polymer, and recovering the treated olefin polymer from the resulting reaction mixture.

PAUL H. CARNELL.

REFERENCES CITED

The following references are of record in the file of this patent:

UNITED STATES PATENTS

| Number | Name | Date |
|---|---|---|
| 2,091,398 | Sullivan et al. | Aug. 31, 1937 |
| 2,220,713 | Grosse et al. | Nov. 5, 1940 |
| 2,329,714 | Grasshof | Sept. 21, 1943 |
| 2,366,743 | Matuszak | Jan. 9, 1945 |
| 2,378,762 | Frey | June 19, 1945 |
| 2,387,162 | Matuszak | Oct. 16, 1945 |